US011889427B2

(12) United States Patent
Vintola et al.

(10) Patent No.: US 11,889,427 B2
(45) Date of Patent: Jan. 30, 2024

(54) RELATIVE POWER SETTING BETWEEN DIFFERENT CELLS IN DUAL CONNECTIVITY OR CARRIER AGGREGATION

(71) Applicant: QUALCOMM Incorporated, San Diego, CA (US)

(72) Inventors: Timo Ville Vintola, San Diego, CA (US); Peter Gaal, San Diego, CA (US); Hemish Parikh, San Diego, CA (US); Masato Kitazoe, Tokyo (JP); Kazuki Takeda, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 17/443,636

(22) Filed: Jul. 27, 2021

(65) Prior Publication Data

US 2023/0032247 A1    Feb. 2, 2023

(51) Int. Cl.
*H04W 52/14* (2009.01)
*H04W 52/38* (2009.01)

(52) U.S. Cl.
CPC ......... *H04W 52/146* (2013.01); *H04W 52/38* (2013.01)

(58) Field of Classification Search
CPC . H04W 52/146; H04W 52/38; H04W 52/367; H04W 52/346; H04W 52/34
See application file for complete search history.

(56) References Cited

U.S. PATENT DOCUMENTS

| | | | | |
|---|---|---|---|---|
| 2011/0081936 | A1* | 4/2011 | Haim | H04W 52/06 455/522 |
| 2013/0215811 | A1* | 8/2013 | Takaoka | H04W 52/30 370/311 |
| 2014/0177584 | A1* | 6/2014 | Ouchi | H04W 52/18 370/329 |
| 2015/0124737 | A1* | 5/2015 | Lee | H04W 52/346 370/329 |
| 2016/0255593 | A1* | 9/2016 | Blankenship | H04J 11/00 370/328 |
| 2017/0150452 | A1* | 5/2017 | Rosa | H04W 52/226 |
| 2017/0202025 | A1* | 7/2017 | Ouchi | H04W 16/32 |
| 2017/0223644 | A1* | 8/2017 | Takaoka | H04W 52/346 |

(Continued)

OTHER PUBLICATIONS

"Dual Connectivity for LTE Small Cell Evolution: Functionality and Performance Aspects"; Rosa et al.; IEEE Communications Magazine • Jun. 2016 (Year: 2016).*

(Continued)

*Primary Examiner* — Benjamin H Elliott, IV
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, signaling that indicates a relative power difference between a first cell and a second cell. The UE may apply the relative power difference in a transmission occasion that includes at least a first uplink transmission on the first cell and a second uplink transmission on the second cell, wherein applying the relative power difference causes the first uplink transmission on the first cell to be transmitted at a lower power level than the second uplink transmission on the second cell. Numerous other aspects are described.

30 Claims, 9 Drawing Sheets

(56) References Cited

U.S. PATENT DOCUMENTS

| | | | | |
|---|---|---|---|---|
| 2018/0146440 A1* | 5/2018 | Hosseini | ............... | H04W 72/12 |
| 2019/0215781 A1* | 7/2019 | Jeon | .................... | H04W 52/325 |
| 2020/0084728 A1* | 3/2020 | Park | ...................... | H04W 72/21 |
| 2020/0229085 A1* | 7/2020 | Hsu | .................. | H04W 52/0209 |
| 2021/0235385 A1* | 7/2021 | Takeda | .................. | H04W 52/42 |
| 2022/0070888 A1* | 3/2022 | Venkata | ............... | H04W 72/56 |
| 2023/0032247 A1* | 2/2023 | Vintola | ............... | H04W 52/146 |

OTHER PUBLICATIONS

"Flexible Dual-Connectivity Spectrum Aggregation for Decoupled Uplink and Downlink Access in 5G Heterogeneous Systems"; Lema et al.; IEEE Journal on Selected Areas in Communications, vol. 34, No. 11, Nov. 2016 (Year: 2016).*

Ericsson, "WF on introduction of power limits for serving cells of UL CA," 3GPP TSG-RAN WG4 Meeting #99-e, R4-2107762, Electronic meeting, May 19-27, 2021, 6 pages.

Ericsson, "LS to RAN2 on power limits for serving cells of UL CA," TSG-RAN Working Group 4 (Radio) meeting #99-e, R4-2109959, Electronic meeting, May 19-27, 2021, 4 pages.

Ericsson, "Introduction of power limits for serving cells of UL CA," 3GPP TSG-RAN WG4 Meeting#99-e, R4-2109957, Electronic meeting, May 19-27, 2021, 12 pages.

International Search Report and Written Opinion—PCT/US2022/072490—ISA/EPO—dated Sep. 13, 2022.

* cited by examiner

RELATIVE POWER SETTING BETWEEN DIFFERENT CELLS IN DUAL CONNECTIVITY OR CARRIER AGGREGATION

FIELD OF THE DISCLOSURE

Aspects of the present disclosure generally relate to wireless communication and to techniques and apparatuses associated with a relative power setting between different cells in dual connectivity or carrier aggregation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a base station, signaling that indicates a relative power difference between a first cell and a second cell. The method may include applying the relative power difference in a transmission occasion that includes at least a first uplink transmission on the first cell and a second uplink transmission on the second cell, wherein applying the relative power difference causes the first uplink transmission on the first cell to be transmitted at a lower power level than the second uplink transmission on the second cell.

Some aspects described herein relate to a UE for wireless communication. The UE may include a memory and one or more processors coupled to the memory. The one or more processors may be configured to receive, from a base station, signaling that indicates a relative power difference between a first cell and a second cell. The one or more processors may be configured to apply the relative power difference in a transmission occasion that includes at least a first uplink transmission on the first cell and a second uplink transmission on the second cell, wherein applying the relative power difference causes the first uplink transmission on the first cell to be transmitted at a lower power level than the second uplink transmission on the second cell.

Some aspects described herein relate to a non-transitory computer-readable medium that stores a set of instructions for wireless communication by a UE. The set of instructions, when executed by one or more processors of the UE, may cause the UE to receive, from a base station, signaling that indicates a relative power difference between a first cell and a second cell. The set of instructions, when executed by one or more processors of the UE, may cause the UE to apply the relative power difference in a transmission occasion that includes at least a first uplink transmission on the first cell and a second uplink transmission on the second cell, wherein applying the relative power difference causes the first uplink transmission on the first cell to be transmitted at a lower power level than the second uplink transmission on the second cell.

Some aspects described herein relate to an apparatus for wireless communication. The apparatus may include means for receiving, from a base station, signaling that indicates a relative power difference between a first cell and a second cell. The apparatus may include means for applying the relative power difference in a transmission occasion that includes at least a first uplink transmission on the first cell and a second uplink transmission on the second cell, wherein applying the relative power difference causes the first uplink transmission on the first cell to be transmitted at a lower power level than the second uplink transmission on the second cell.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
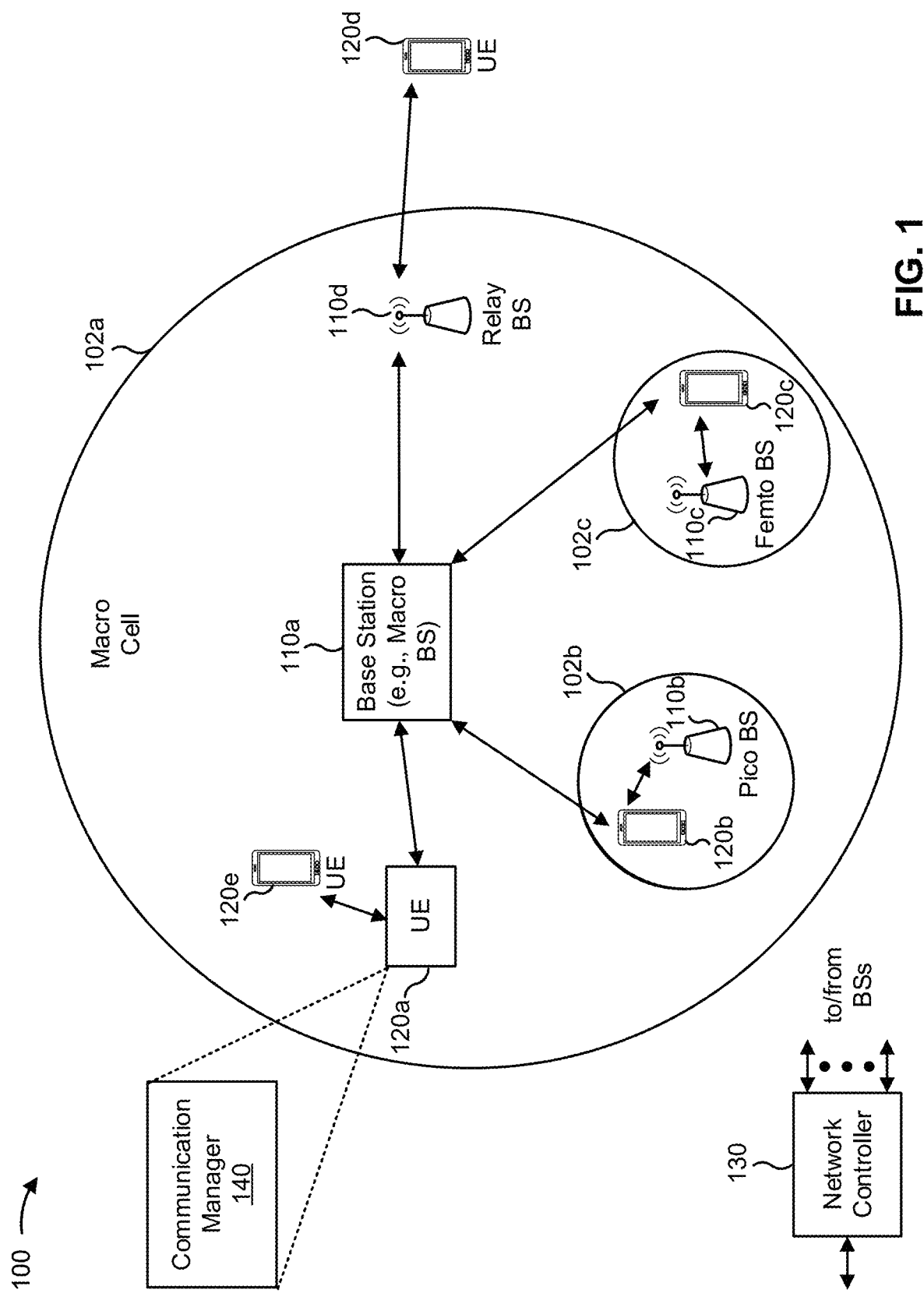
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station 110, signaling that indicates a relative power difference between a first cell and a second cell; and apply the relative power difference in a transmission occasion that includes at least a first uplink transmission on the first cell and a second uplink transmission on the second cell, wherein applying the relative power difference causes the first uplink transmission on the first cell to be transmitted at a lower power level than the second uplink transmission on the second cell. Additionally, or alternatively, the communication manager 140 may perform one or more other operations described herein.

As indicated above, FIG. 1 is provided as an example. Other examples may differ from what is described with regard to FIG. 1.

Figure 2:
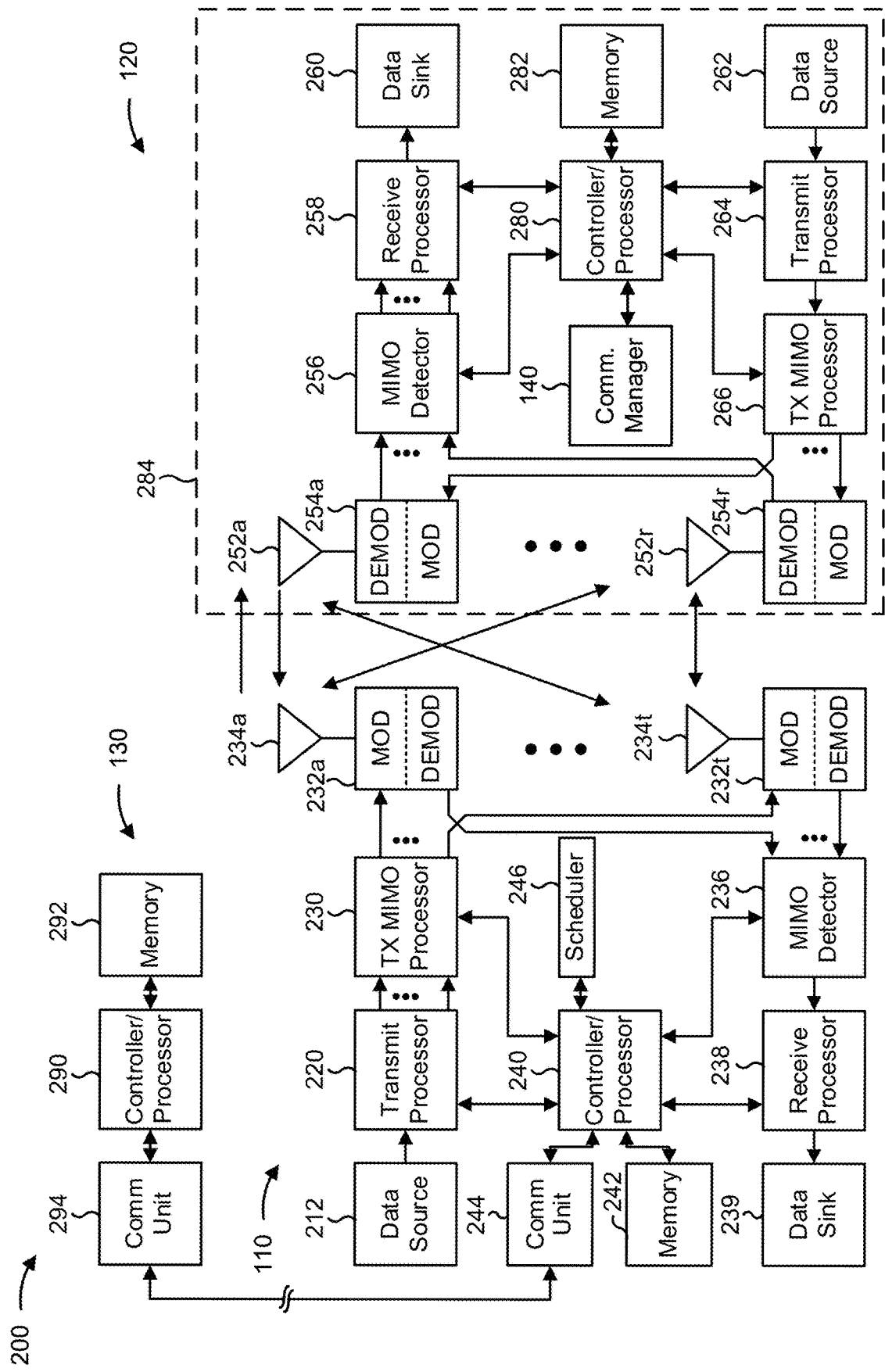
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-9).

The controller/processor 240 of the base station 110, the controller/processor 280 of the UE 120, and/or any other component(s) of FIG. 2 may perform one or more techniques associated with a relative power setting between different cells in dual connectivity or carrier aggregation, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8 and/or other processes as described herein. In some examples, executing instructions may include running the instructions, converting the instructions, compiling the instructions, and/or interpreting the instructions, among other examples.

In some aspects, the UE 120 includes means for receiving, from the base station 110, signaling that indicates a relative power difference between a first cell and a second cell; and/or means for applying the relative power difference in a transmission occasion that includes at least a first uplink transmission on the first cell and a second uplink transmission on the second cell, wherein applying the relative power difference causes the first uplink transmission on the first cell to be transmitted at a lower power level than the second uplink transmission on the second cell. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
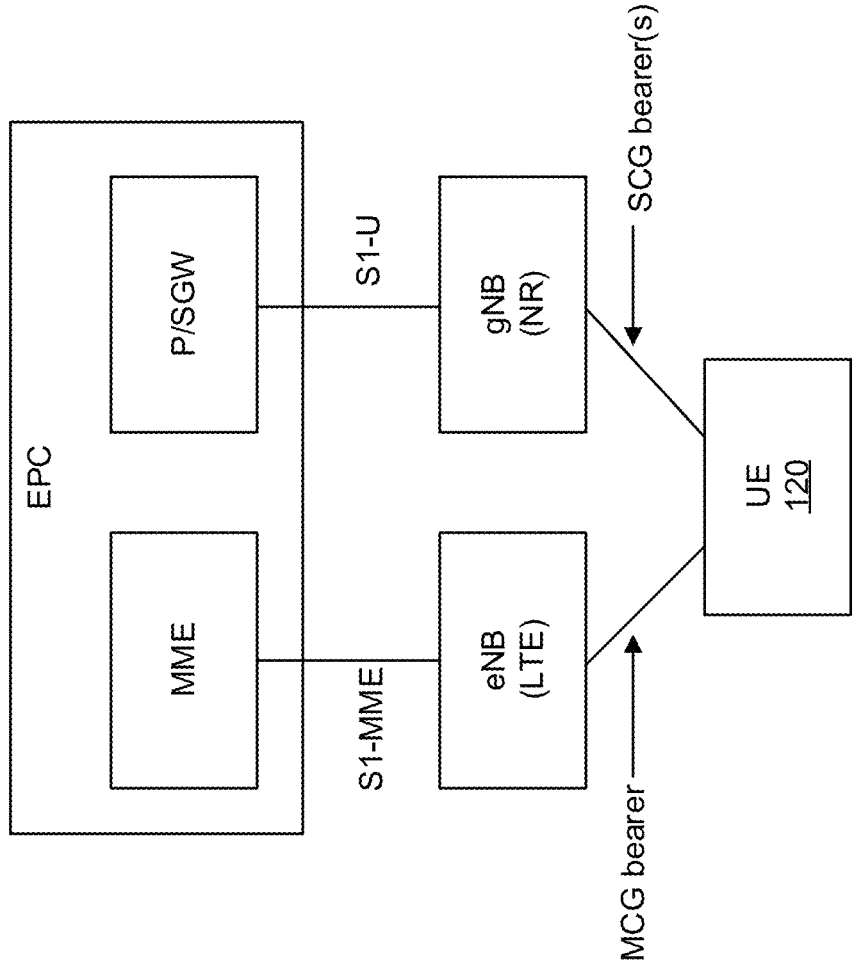
FIG. 3 is a diagram illustrating an example of dual connectivity, in accordance with the present disclosure.

FIG. 3 is a diagram illustrating an example 300 of dual connectivity, in accordance with the present disclosure. The example shown in FIG. 3 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). The MCG may generally include a primary cell (Pcell) and one or more secondary cells (Scells), and the SCG may include one or more secondary cells (Scells), one of which may be designated as a primary secondary cell (PScell) (e.g., an Scell configured for downlink and uplink communication). Additionally, or alternatively, one or more of the MCG or the SCG may include an Scell that is designated as a physical uplink control channel Scell (PUCCH-Scell) to carry uplink control information, such as hybrid automatic repeat request (HARD) feedback for one or more downlink transmissions. Furthermore, although FIG. 3 illustrates an example of dual connectivity in an ENDC mode, some aspects described herein may apply to an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., where the MCG is associated with a first RAT and the SCG is associated with one of the first RAT or a second RAT and/or where the MCG is associated with a first frequency range, such as FR1, and the SCG is associated with a second frequency range, such as FR2). The ENDC mode is sometimes referred to as an NR or 5G non-standalone (NSA) mode. Thus, as used herein, "dual connectivity mode" may refer to an ENDC mode, an NEDC mode, an NRDC mode, and/or another type of dual connectivity mode.

As shown in FIG. 3, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or other devices. In FIG. 3, the PGW and the SGW are shown collectively as P/SGW. The eNB and the gNB may be co-located at the same base station 110, or the eNB and the gNB may be included in different base stations 110 (e.g., may not be co-located).

As further shown in FIG. 3, a wireless network that permits operation in a 5G NSA mode may permit such operations using an MCG for a first RAT (e.g., an LTE RAT or a 4G RAT) and an SCG for a second RAT (e.g., an NR RAT or a 5G RAT). In this case, the UE 120 may communicate with the eNB via the MCG, and may communicate with the gNB via the SCG. The MCG may anchor a network connection between the UE 120 and the 4G/LTE core network (e.g., for mobility, coverage, and/or control plane information), and the SCG may be added as additional carriers to increase throughput (e.g., for data traffic and/or user plane information). The gNB and the eNB may not transfer user plane information between one another. A UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT (e.g., in the case of NRDC). The MCG may be associated with a first frequency band (e.g., a sub-6 GHz band and/or an FR1 band) and the SCG may be associated with a second frequency band (e.g., a millimeter wave band and/or an FR2 band).

The UE 120 may communicate via the MCG and the SCG using one or more radio bearers (e.g., data radio bearers (DRBs) and/or signaling radio bearers (SRBs)). For example, the UE 120 may transmit or receive data via the MCG and/or the SCG using one or more DRBs. Similarly, the UE 120 may transmit or receive control information (e.g., radio resource control (RRC) information and/or measurement reports) using one or more SRBs. A radio bearer may be dedicated to a specific cell group (e.g., a radio bearer may be an MCG bearer or an SCG bearer). Additionally, or alternatively, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). A DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

As indicated above, FIG. 3 is provided as an example. Other examples may differ from what is described with respect to FIG. 3.

Figure 4:
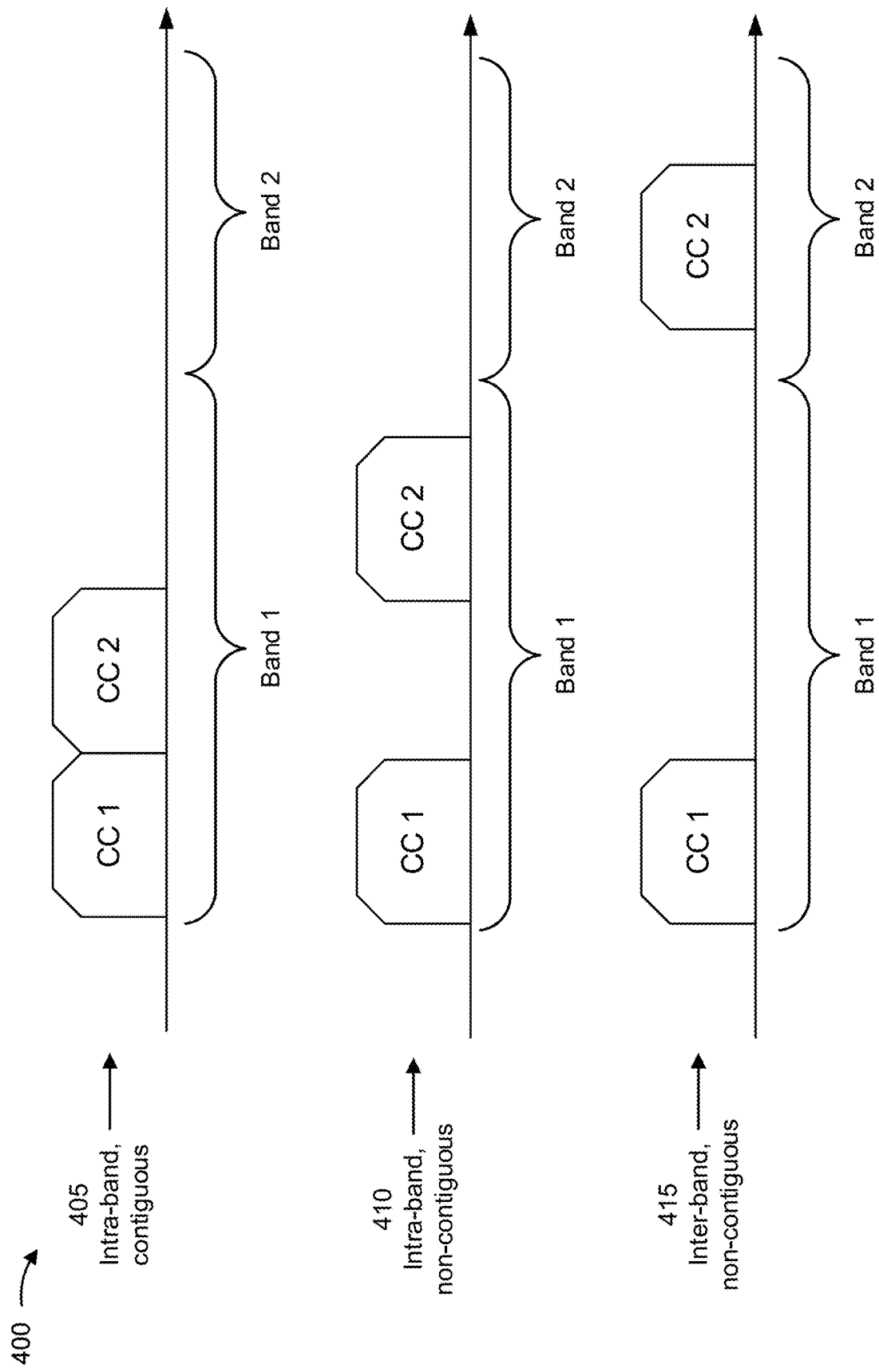
FIG. 4 is a diagram illustrating examples of carrier aggregation, in accordance with the present disclosure.

FIG. 4 is a diagram illustrating examples 400 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A base station 110 may configure carrier aggregation for a UE 120, such as in an RRC message, a medium access control (MAC) control element (MAC-CE), downlink control information (DCI), and/or another signaling message.

As shown by reference number 405, in some aspects, carrier aggregation may be configured in an intra-band contiguous mode where the aggregated carriers are contiguous to one another and are in the same band. As shown by reference number 410, in some aspects, carrier aggregation may be configured in an intra-band non-contiguous mode where the aggregated carriers are non-contiguous to one another and are in the same band. As shown by reference number 415, in some aspects, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (SCells), one of which may be designated as a PScell. Additionally, or alternatively, an Scell may be designated or otherwise configured as a PUCCH-Scell to carry uplink control information, such as HARQ feedback for one or more downlink transmission. In some aspects, the primary carrier may carry control information (e.g., DCI and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

As indicated above, FIG. 4 is provided as an example. Other examples may differ from what is described with regard to FIG. 4.

Figure 5:
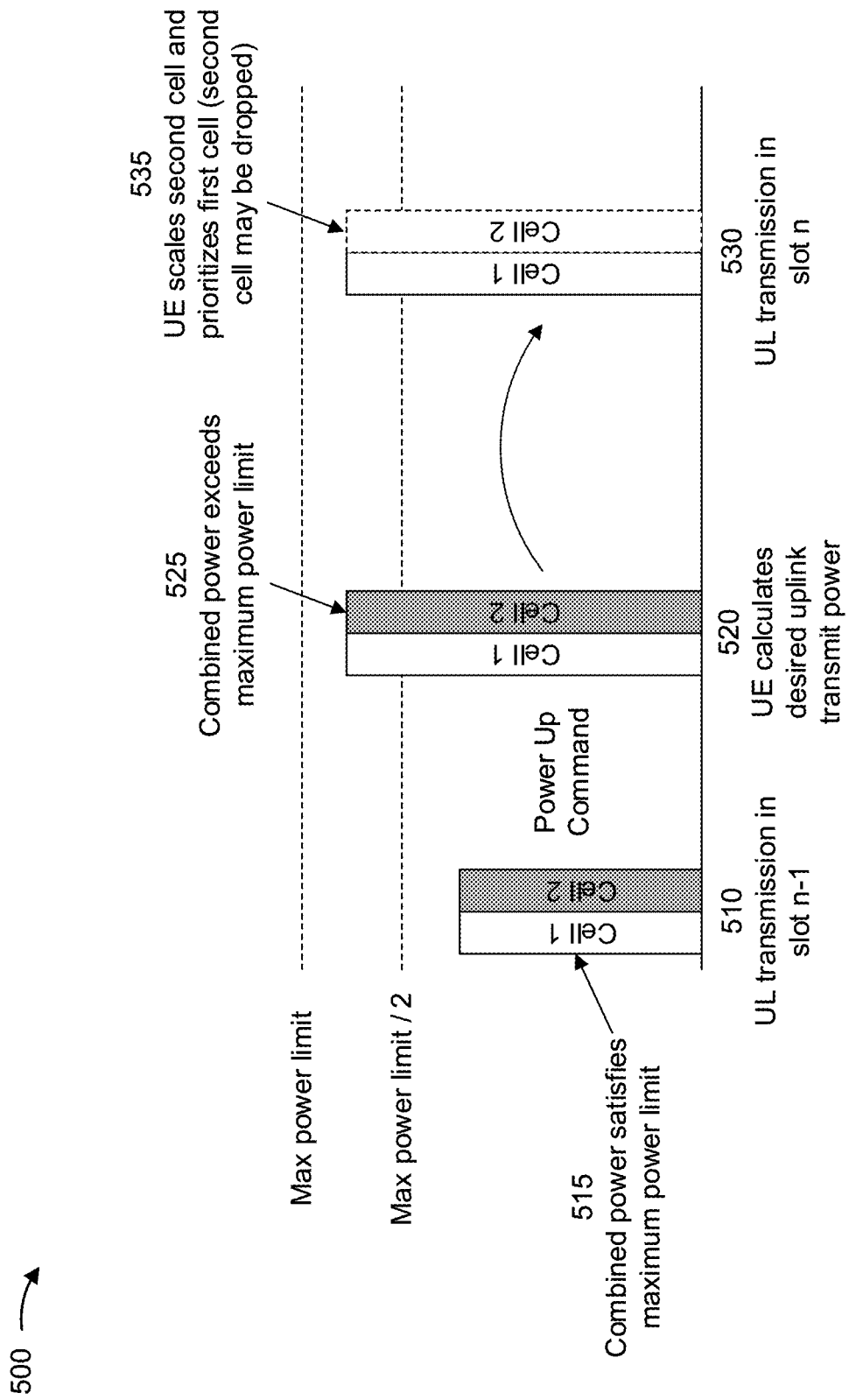
FIG. 5 is a diagram illustrating an example of uplink power scaling that may result in dropped transmissions, in accordance with the present disclosure.

FIG. 5 is a diagram illustrating an example of uplink power scaling that may result in dropped transmissions, in accordance with the present disclosure. As described herein, example 500 includes communication between a UE (e.g., UE 120) and a base station (e.g., base station 110), which may be included in a wireless network (e.g., wireless network 100). The base station and the UE may communicate via a wireless access link, which may include an uplink and a downlink.

As described herein, the UE may be configured to communicate on the uplink using two or more uplink carriers. For example, the UE may be configured to communicate on the uplink using at least a first cell (shown as Cell 1) and a second cell (shown as Cell 2), where the first cell may include a Pcell, a PScell, or PUCCH-Scell and the second cell may include one or more Scells. In general, the UE may be configured with a maximum power limit that defines an upper bound on a total transmit power that the UE can use for uplink transmissions in a single transmission occasion, which may be defined by a slot index within a frame that has a particular system frame number (SFN), a first symbol within the slot, and a number of consecutive symbols. For example, the maximum power limit may be a UE maximum power limit (e.g., defined according to an internal configuration) or a maximum power limit that is configured by a wireless network (e.g., defined for one or more carriers, such as a maximum power limit for one or more Scells when all Scells are in FR2 and a Pcell is in FR1, a maximum power limit $P_{LTE}$ for transmissions using an LTE RAT, and/or a maximum power limit $P_{NR}$ for transmissions using an NR RAT, among other examples). Accordingly, in cases where the UE determines that a total transmit power for multiple uplink transmissions in a transmission occasion would fail to satisfy (e.g., exceed) the maximum power limit for the transmission occasion, the UE may allocate power to the uplink transmissions according to a priority order such that the total UE transmit power satisfies (e.g., is less than or equal to) the maximum power limit in each symbol of the transmission occasion. For example, according to existing rules (e.g., defined in 3GPP Technical Specification 38.213), the UE may prioritize power allocation for transmissions on a Pcell, PScell, or PUCCH-Scell over transmissions on an Scell and/or may determine relative priorities among multiple Scells based on channel content (e.g., prioritizing Scells with PUCCH transmissions that include HARQ feedback or physical uplink shared channel (PUSCH) transmissions that include control information over other Scells with PUSCH transmissions that carry only data, which may have a lowest priority). As a result, in cases where a total transmit power associated with multiple uplink transmissions in a transmission occasion fails to satisfy (e.g., exceeds) the maximum power limit for the transmission occasion, the UE may scale down or drop one or more Scell transmissions.

For example, as shown in FIG. 5, and by reference number 510, a first transmission occasion (e.g., shown as slot n−1) may include a first uplink transmission configured on the first cell (e.g., a Pcell, PScell, or PUCCH-Scell) and a second uplink transmission configured on the second cell (e.g., an Scell). As further shown by reference number 515, a combined transmit power for the first uplink transmission and the second uplink transmission satisfies the maximum power limit for the first transmission occasion (e.g., because the transmit power for each uplink transmission is less than half of the maximum power limit, such that the sum is less than the maximum power limit). Accordingly, in the first transmission occasion, the UE may transmit the first uplink transmission on the first cell and the second uplink transmission on the first cell without performing any power scaling or power reduction.

However, as further shown by reference number 520, the UE may calculate a desired uplink transmit power for a next transmission occasion based on a power up command that may be received from the base station prior to the next transmission occasion. In this case, as shown by reference number 525, the combined transmit power for the first uplink transmission and the second uplink transmission fails to satisfy the maximum power limit for the next transmission occasion (e.g., because the transmit power for each uplink transmission exceeds half of the maximum power limit, such that the sum would exceed the maximum power limit). Accordingly, as shown by reference number 530, the UE may scale down the power of the uplink transmission on the second cell and prioritize the uplink transmission on the first cell to ensure that the total transmit power in the next transmission occasion satisfies the maximum power limit. In some cases, as shown by reference number 535, the power of the uplink transmission on the second cell may potentially be scaled down to zero, which may result in the UE dropping the uplink transmission on the second cell.

One possible approach to mitigate the UE scaling down or dropping uplink transmissions on one or more Scells may be for the network to configure an upper power limit for each cell separately. However, configuring an upper power limit for each cell does not indicate how the UE is to handle the transmit power for other cells. For example, a network may configure a maximum power, $P_{NR}$, for FR1 transmissions on a Pcell that is lower than a maximum power for one or more Scells, but there are no corresponding parameters that can be used to restrict the maximum power for millimeter wave frequencies (e.g., above 24 GHz). Furthermore, even in cases where the maximum power is limited on a Pcell, PScell, or PUCCH-Scell, the UE may still end up scaling down the power on one or more Scells (e.g., because limiting the maximum power on a particular cell only limits the power on that cell and does not guarantee that the UE will use a larger transmit power for other cells). Accordingly, some aspects described herein relate to techniques and apparatuses to configure a relative power difference between different uplink cells. For example, as described herein, a base station may configure the relative power difference as a decibel (dB) value, a ratio, or a percentage value, and the UE may scale down the transmit power of an uplink transmission on a Pcell, a PScell, and/or a PUCCH-Scell according to the relative power difference. In this way, the uplink transmission on the Pcell, PScell, and/or PUCCH-Scell may have a lower transmit power than one or more Scells, which may ensure that the UE does not repeatedly scale down or drop uplink transmissions on Scells.

As indicated above, FIG. 5 is provided as an example. Other examples may differ from what is described with regard to FIG. 5.

Figure 6:
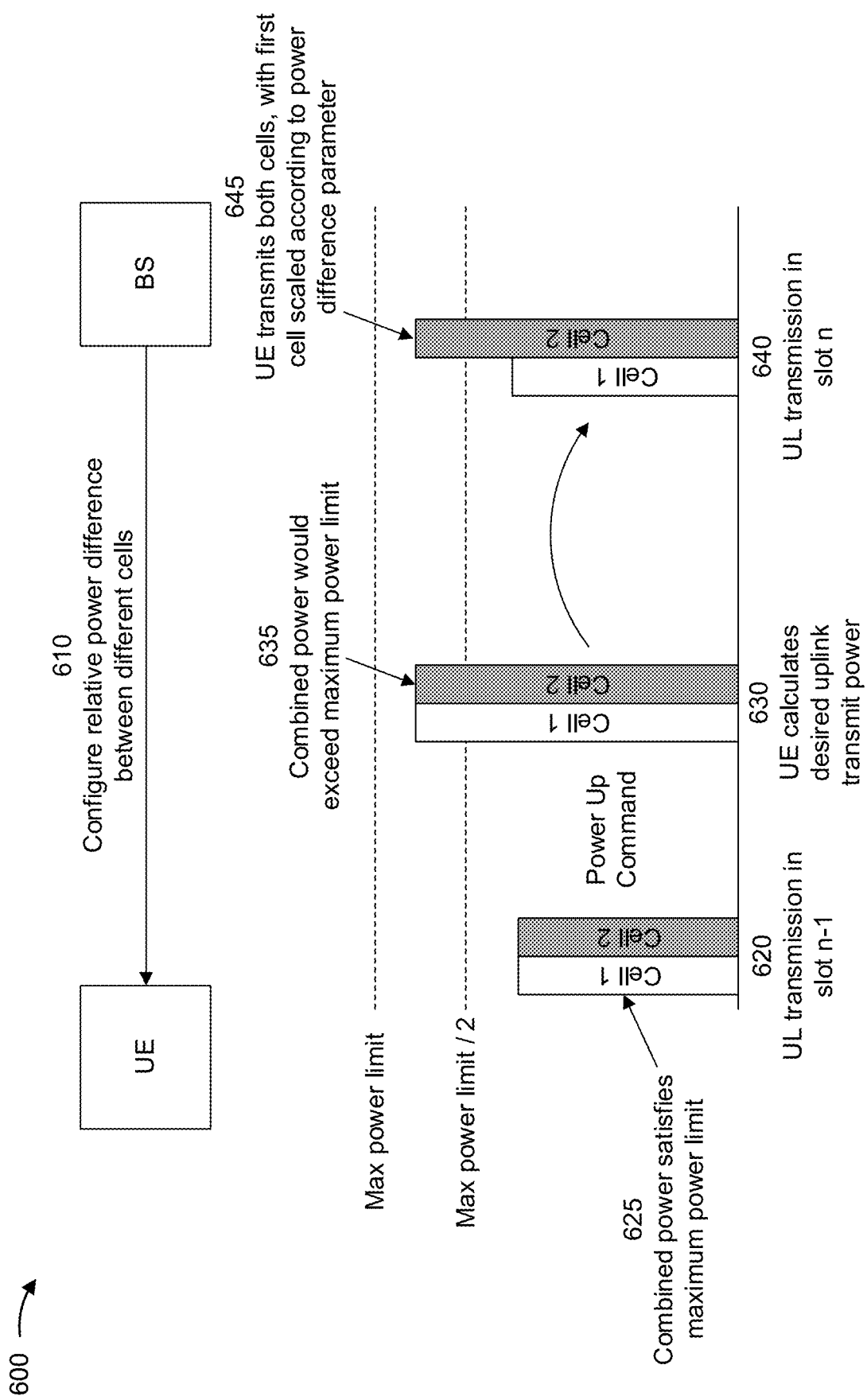
FIGS. 6-7 are diagrams illustrating examples associated with a relative power setting between different cells in dual connectivity or carrier aggregation, in accordance with the present disclosure.

FIG. 6 is a diagram illustrating an example 600 associated with a relative power setting between different cells in dual connectivity or carrier aggregation, in accordance with the present disclosure. As shown in FIG. 6, example 600 includes communication between a UE (e.g., UE 120) and a base station (e.g., base station 110), which may be included in a wireless network (e.g., wireless network 100). In some aspects, the base station and the UE may communicate via a wireless access link, which may include an uplink and a downlink.

In some aspects, the UE may be configured to communicate on the uplink using two or more uplink carriers. For example, in some aspects, the UE may be configured to communicate using two or more uplink carriers according to an uplink dual connectivity configuration, an intra-band uplink carrier aggregation configuration, and/or an inter-band uplink carrier aggregation configuration, among other examples. For example, the UE may be configured to communicate on the uplink using at least a first cell (shown as Cell 1) and a second cell (shown as Cell 2), where the first cell may include a Pcell, a PScell, or PUCCH-Scell and the second cell may include one or more Scells. In general, the UE may be configured with a maximum power limit that defines an upper bound on a total transmit power that the UE can use for uplink transmissions in a single transmission occasion, which may be defined by a slot index within a frame that has a particular SFN, a first symbol within the slot, and a number of consecutive symbols. For example, the maximum power limit may be a UE maximum power limit (e.g., defined according to an internal configuration) or a maximum power limit that is configured by a wireless network.

As shown in FIG. 6, and by reference number 610, the base station may transmit, and the UE may receive, signaling that indicates a relative power difference between a first cell and a second cell (e.g., between a Pcell and an Scell, between a PScell and an Scell, between a PUCCH-Scell and an Scell, between a Pcell and a PScell, and/or between a first Scell and a second Scell, among other examples). For example, in some aspects, the base station may configure the relative power difference based on the UE dropping or scaling down the transmit power on the second cell in one or more transmission occasions such that a lower transmit power may be accepted on the first cell to ensure that the transmissions on the second cell are not dropped or scaled down. In some aspects, the signaling to indicate the relative power difference may include an RRC message, a MAC-CE, and/or DCI, and the relative power difference may be indicated according to a dB value, a ratio, and/or a percentage value. For example, in cases where the relative power difference is indicated according to a dB value, the transmit power of the first cell may be scaled down to be n dB less than the transmit power of the second cell when the relative power difference is applied to uplink transmissions within a transmission occasion. Alternatively, in cases where the relative power difference is indicated according to a ratio or percentage value, the transmit power of the second cell may be multiplied by the ratio or percentage value to determine the transmit power of the first cell. In some aspects, as shown in FIG. 6, the UE may conditionally apply the relative power difference in one or more transmission occasions based on determining that a total (combined) transmit power for multiple uplink transmissions in a transmission occasion fail to satisfy a maximum power limit for the transmission occasion.

For example, as shown in FIG. 6, and by reference number 620, a first transmission occasion (e.g., shown as slot n−1) may include a first uplink transmission configured on the first cell and a second uplink transmission configured on the second cell. As further shown by reference number 625, a combined transmit power for the first uplink transmission and the second uplink transmission satisfies the maximum power limit for the first transmission occasion (e.g., because the transmit power for each uplink transmission is less than half of the maximum power limit, such that the sum is less than the maximum power limit). Accordingly, in the first transmission occasion, the UE may transmit the first uplink transmission on the first cell and the second uplink transmission on the first cell without applying the relative power difference between the first cell and the second cell to scale down or reduce the power on the first cell.

However, as further shown by reference number 630, the UE may calculate a desired uplink transmit power for a next transmission occasion based on a power up command that may be received from the base station prior to the next transmission occasion. In this case, as shown by reference number 635, the combined transmit power for the first uplink transmission and the second uplink transmission fails to satisfy the maximum power limit for the next transmission occasion (e.g., because the transmit power for each uplink transmission exceeds half of the maximum power limit, such that the sum would exceed the maximum power limit). Accordingly, as shown by reference number 640, the UE may scale down the power of the uplink transmission on the first cell by applying the relative power difference between the first cell and the second cell. For example, as shown by reference number 645, applying the relative power difference causes the transmit power of the first uplink transmission on the first cell to be at a lower level than the second uplink transmission on the second cell. In this way, the UE may transmit both the first uplink transmission on the first cell and the second uplink transmission on the second cell, with no power scaling applied to the second uplink transmission and the first uplink transmission scaled according to the relative power difference configured by the base station. In this way, even though the transmit power of the second uplink transmission exceeds half of the maximum power limit, the UE can transmit both the first uplink transmission on the first cell and the second uplink transmission on the second cell because the combined transmit power is less than the maximum power limit after applying the relative power difference.

As indicated above, FIG. 6 is provided as an example. Other examples may differ from what is described with regard to FIG. 6.

Figure 7:
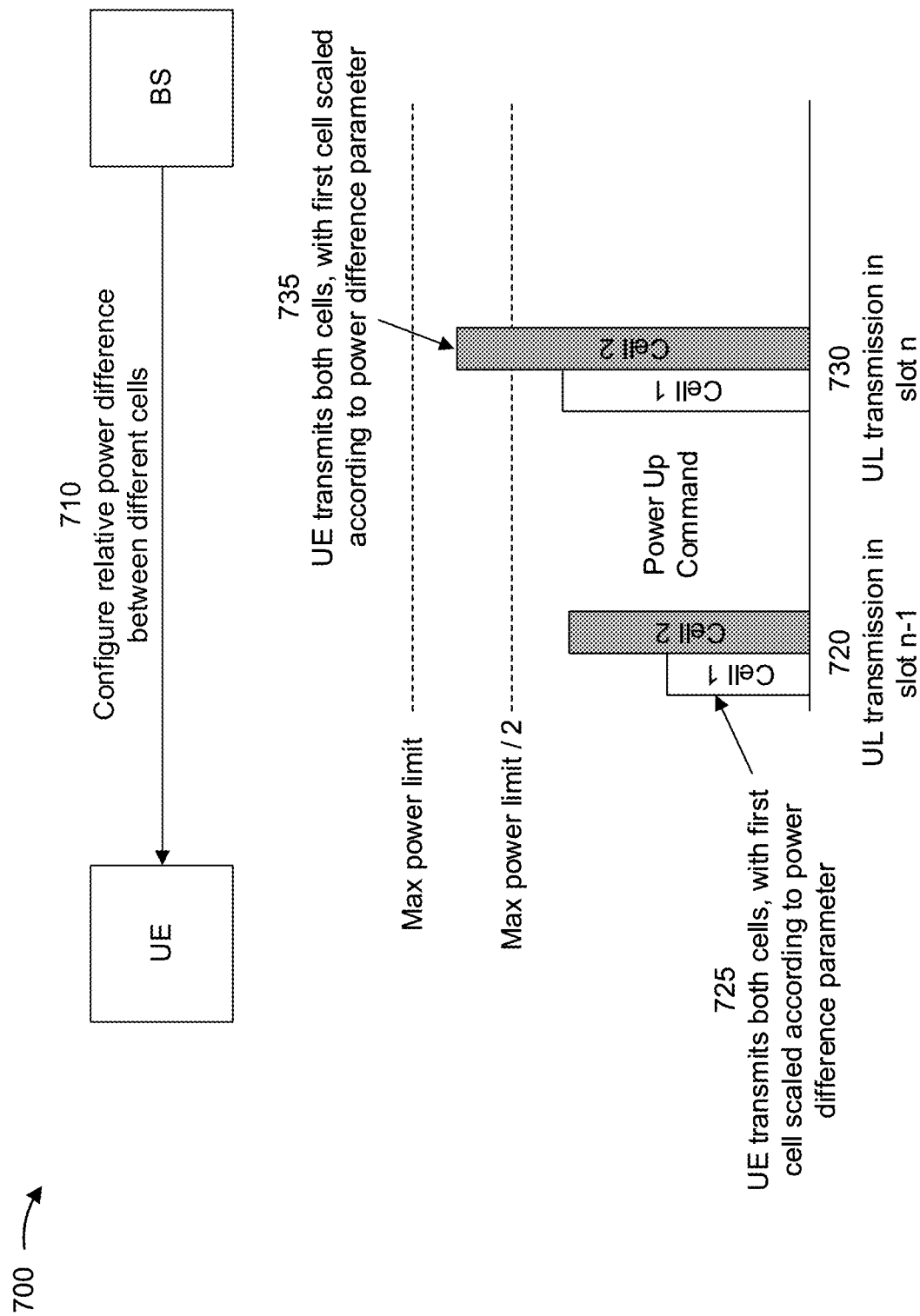

FIG. 7 is a diagram illustrating an example 700 associated with a relative power setting between different cells in dual connectivity or carrier aggregation, in accordance with the present disclosure. As shown in FIG. 7, example 700 includes communication between a UE (e.g., UE 120) and a base station (e.g., base station 110), which may be included in a wireless network (e.g., wireless network 100). In some aspects, the base station and the UE may communicate via a wireless access link, which may include an uplink and a downlink.

In some aspects, the UE may be configured to communicate on the uplink using two or more uplink carriers. For example, in some aspects, the UE may be configured to communicate using two or more uplink carriers according to an uplink dual connectivity configuration, an intra-band uplink carrier aggregation configuration, and/or an inter-band uplink carrier aggregation configuration, among other examples. For example, the UE may be configured to communicate on the uplink using at least a first cell (shown as Cell 1) and a second cell (shown as Cell 2), where the first cell may include a Pcell, a PScell, or PUCCH-Scell and the second cell may include one or more Scells. In general, the UE may be configured with a maximum power limit that defines an upper bound on a total transmit power that the UE can use for uplink transmissions in a single transmission occasion, which may be defined by a slot index within a frame that has a particular SFN, a first symbol within the slot, and a number of consecutive symbols. For example, the maximum power limit may be a UE maximum power limit (e.g., defined according to an internal configuration) or a maximum power limit that is configured by a wireless network.

As shown in FIG. 7, and by reference number 710, the base station may transmit, and the UE may receive, signaling that indicates a relative power difference between a first cell and a second cell (e.g., between a Pcell and an Scell, between a PScell and an Scell, between a PUCCH-Scell and an Scell, between a Pcell and a PScell, and/or between a first Scell and a second Scell, among other examples). For example, in some aspects, the base station may configure the relative power difference based on the UE dropping or scaling down the transmit power on the second cell in one or more transmission occasions such that a lower transmit power may be accepted on the first cell to ensure that the transmissions on the second cell are not dropped or scaled down. In some aspects, the signaling to indicate the relative power difference may include an RRC message, a MAC-CE, and/or DCI, and the relative power difference may be indicated according to a dB value, a ratio, and/or a percentage value. For example, in cases where the relative power difference is indicated according to a dB value, the transmit power of the first cell may be scaled down to be n dB less than the transmit power of the second cell when the relative power difference is applied to uplink transmissions within a transmission occasion. Alternatively, in cases where the relative power difference is indicated according to a ratio or percentage value, the transmit power of the second cell may be multiplied by the ratio or percentage value to determine the transmit power of the first cell. In some aspects, as shown in FIG. 7, the UE may apply the relative power difference in each transmission occasion when there are uplink transmissions on both the first cell and the second cell.

For example, as shown in FIG. 7, and by reference number 720, a first transmission occasion (e.g., shown as slot n−1) may include a first uplink transmission configured on the first cell and a second uplink transmission configured on the second cell. As further shown by reference number 725, the UE may apply the relative power difference such that the first uplink transmission is transmitted at a lower power level than the second uplink transmission. In this case, the UE may apply the relative power difference to scale down the power of the first uplink transmission even though the combined transmit power for the first uplink transmission and the second uplink transmission without power scaling would have satisfied the maximum power limit for the first transmission occasion.

Similarly, as further shown by reference number 730, a second transmission occasion (e.g., shown as slot n) may include a first uplink transmission configured on the first cell and a second uplink transmission configured on the second cell. In this case, however, a desired uplink transmit power for the second transmission occasion may be increased based on a power up command from the base station. Accordingly, as shown by reference number 735, the UE may again apply the relative power difference to scale down the transmit power of the first uplink transmission on the first cell such that the combined transmit power for the first uplink transmission and the second uplink transmission satisfies the maximum power limit for the second transmission occasion. In this way, the network may configure the relative power difference to prioritize uplink transmissions on the second cell when appropriate (e.g., the second cell carries important data of interest). Furthermore, in some cases, configuring the UE to always apply the relative power difference may permit the UE to scale down the transmit power of the first cell such that the UE may drop the first cell if applying the relative power difference results in the first cell having a transmit power that fails to satisfy a threshold (e.g., a minimum value to allow transmission to occur).

As indicated above, FIG. 7 is provided as an example. Other examples may differ from what is described with regard to FIG. 7.

Figure 8:
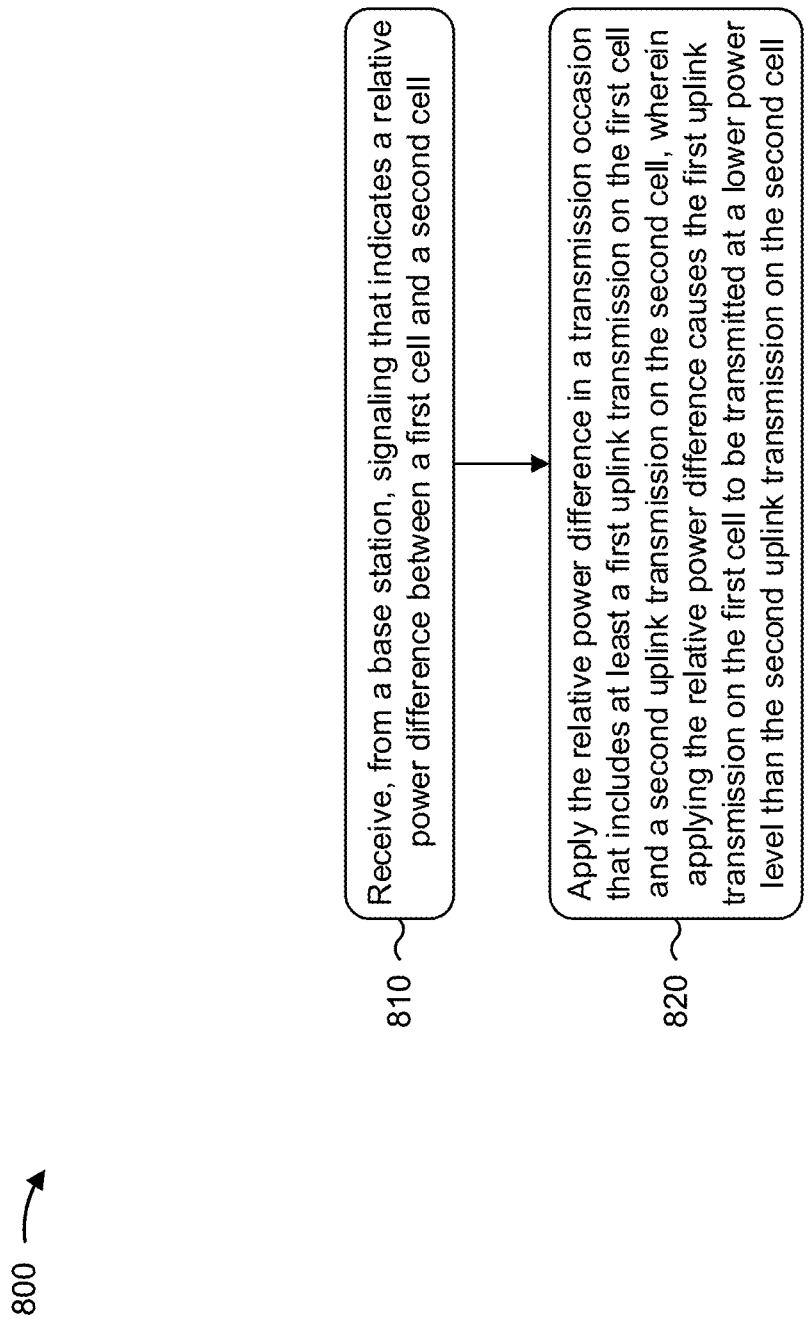
FIG. 8 is a diagram illustrating an example process associated with a relative power setting between different cells in dual connectivity or carrier aggregation, in accordance with the present disclosure.

FIG. 8 is a diagram illustrating an example process 800 performed, for example, by a UE, in accordance with the present disclosure. Example process 800 is an example where the UE (e.g., UE 120) performs operations associated with a relative power setting between different cells in dual connectivity or carrier aggregation.

As shown in FIG. 8, in some aspects, process 800 may include receiving, from a base station, signaling that indicates a relative power difference between a first cell and a second cell (block 810). For example, the UE (e.g., using communication manager 140 and/or reception component 902, depicted in FIG. 9) may receive, from a base station, signaling that indicates a relative power difference between a first cell and a second cell, as described above.

As further shown in FIG. 8, in some aspects, process 800 may include applying the relative power difference in a transmission occasion that includes at least a first uplink transmission on the first cell and a second uplink transmission on the second cell, wherein applying the relative power difference causes the first uplink transmission on the first cell to be transmitted at a lower power level than the second uplink transmission on the second cell (block 820). For example, the UE (e.g., using communication manager 140 and/or power control component 908, depicted in FIG. 9) may apply the relative power difference in a transmission occasion that includes at least a first uplink transmission on the first cell and a second uplink transmission on the second cell, wherein applying the relative power difference causes the first uplink transmission on the first cell to be transmitted at a lower power level than the second uplink transmission on the second cell, as described above.

Process 800 may include additional aspects, such as any single aspect or any combination of aspects described below and/or in connection with one or more other processes described elsewhere herein.

In a first aspect, the first cell includes a Pcell, a PScell, or a PUCCH-Scell, and the second cell includes one or more Scells.

In a second aspect, alone or in combination with the first aspect, the relative power difference is applied based at least in part on the first uplink transmission on the first cell and the second uplink transmission on the second cell having a total calculated transmit power that fails to satisfy a maximum power limit for the transmission occasion.

In a third aspect, alone or in combination with one or more of the first and second aspects, applying the relative power difference causes the first uplink transmission on the first cell and the second uplink transmission on the second cell to have a total actual transmit power that satisfies the maximum power limit for the transmission occasion.

In a fourth aspect, alone or in combination with one or more of the first through third aspects, applying the relative power difference causes the first uplink transmission on the first cell to be scaled or dropped.

In a fifth aspect, alone or in combination with one or more of the first through fourth aspects, the signaling indicates the relative power difference as a dB value.

In a sixth aspect, alone or in combination with one or more of the first through fifth aspects, the signaling indicates the relative power difference as a ratio or a percentage value.

In a seventh aspect, alone or in combination with one or more of the first through sixth aspects, the signaling that indicates the relative power difference includes an RRC message, a MAC-CE, or DCI.

In an eighth aspect, alone or in combination with one or more of the first through seventh aspects, the relative power difference is indicated for an uplink carrier aggregation configuration or an uplink dual connectivity configuration.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
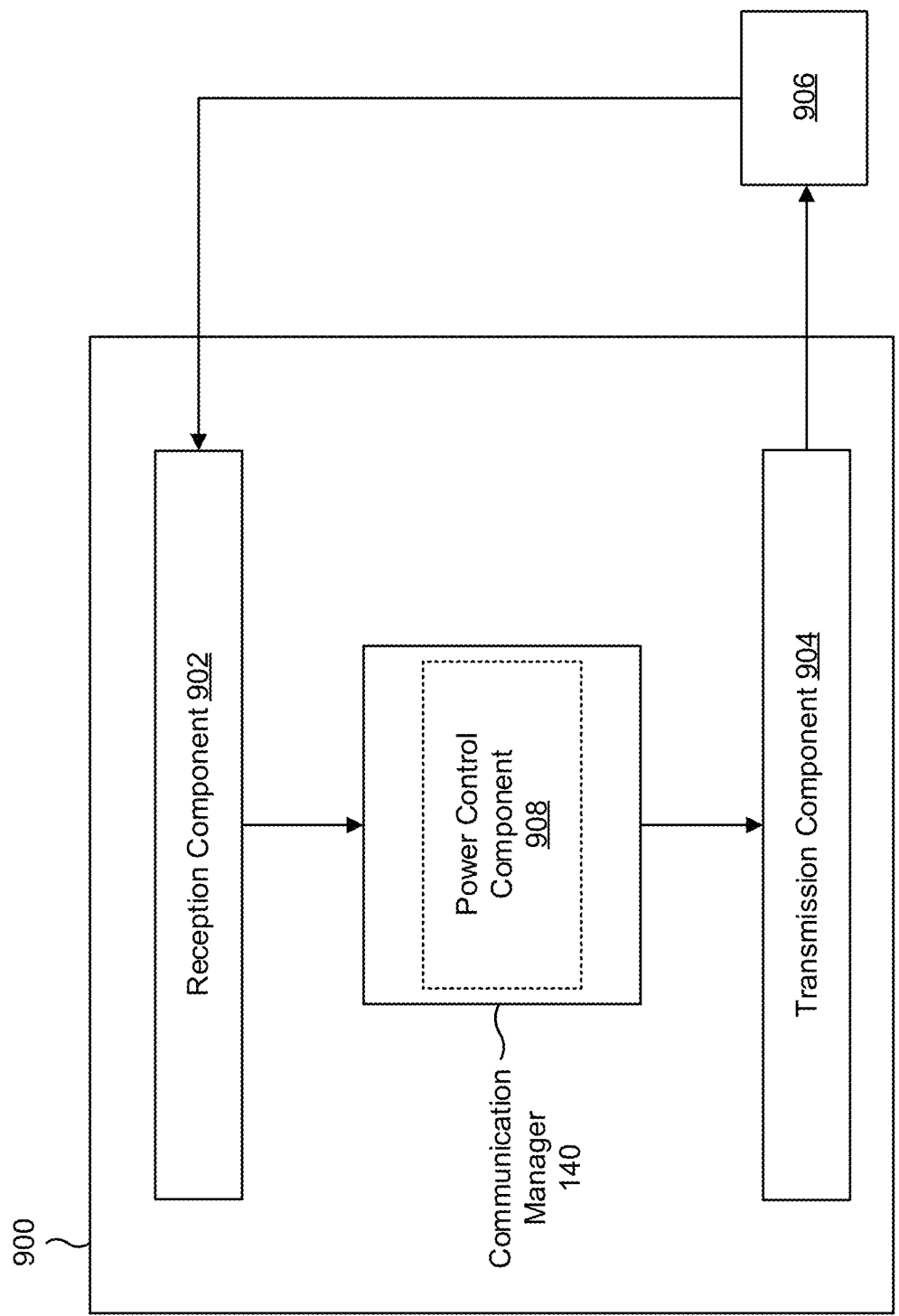
FIG. 9 is a diagram of an example apparatus for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a power control component 908, among other examples.

In some aspects, the apparatus 900 may be configured to perform one or more operations described herein in connection with FIGS. 6-7. Additionally, or alternatively, the apparatus 900 may be configured to perform one or more processes described herein, such as process 800 of FIG. 8. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive, from a base station, signaling that indicates a relative power difference between a first cell and a second cell. The power control component 908 may apply the relative power difference in a transmission occasion that includes at least a first uplink transmission on the first cell and a second uplink transmission on the second cell, wherein applying the relative power difference causes the first uplink transmission on the first cell to be transmitted at a lower power level than the second uplink transmission on the second cell.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: receiving, from a base station, signaling that indicates a relative power difference between a first cell and a second cell; and applying the relative power difference in a transmission occasion that includes at least a first uplink transmission on the first cell and a second uplink transmission on the second cell, wherein applying the relative power difference causes the first uplink transmission on the first cell to be transmitted at a lower power level than the second uplink transmission on the second cell.

Aspect 2: The method of Aspect 1, wherein the first cell includes a Pcell, a PScell, or a PUCCH-Scell, and wherein the second cell includes one or more Scells.

Aspect 3: The method of any of Aspects 1-2, wherein the relative power difference is applied based at least in part on the first uplink transmission on the first cell and the second uplink transmission on the second cell having a total calculated transmit power that fails to satisfy a maximum power limit for the transmission occasion.

Aspect 4: The method of Aspect 3, wherein applying the relative power difference causes the first uplink transmission on the first cell and the second uplink transmission on the second cell to have a total actual transmit power that satisfies the maximum power limit for the transmission occasion.

Aspect 5: The method of any of Aspects 1-4, wherein applying the relative power difference causes the first uplink transmission on the first cell to be scaled or dropped.

Aspect 6: The method of any of Aspects 1-5, wherein the signaling indicates the relative power difference as a dB value.

Aspect 7: The method of any of Aspects 1-5, wherein the signaling indicates the relative power difference as a ratio or a percentage value.

Aspect 8: The method of any of Aspects 1-7, wherein the signaling that indicates the relative power difference includes an RRC message, a MAC-CE, or DCI.

Aspect 9: The method of any of Aspects 1-8, wherein the relative power difference is indicated for an uplink carrier aggregation configuration or an uplink dual connectivity configuration.

Aspect 10: An apparatus for wireless communication at a device, comprising a processor; memory coupled with the processor; and instructions stored in the memory and executable by the processor to cause the apparatus to perform the method of one or more of Aspects 1-9.

Aspect 11: A device for wireless communication, comprising a memory and one or more processors coupled to the memory, the one or more processors configured to perform the method of one or more of Aspects 1-9.

Aspect 12: An apparatus for wireless communication, comprising at least one means for performing the method of one or more of Aspects 1-9.

Aspect 13: A non-transitory computer-readable medium storing code for wireless communication, the code comprising instructions executable by a processor to perform the method of one or more of Aspects 1-9.

Aspect 14: A non-transitory computer-readable medium storing a set of instructions for wireless communication, the set of instructions comprising one or more instructions that, when executed by one or more processors of a device, cause the device to perform the method of one or more of Aspects 1-9.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a base station, signaling that indicates a relative power difference between a first cell and a second cell; and
   applying the relative power difference in a transmission occasion that includes at least a first uplink transmission on the first cell and a second uplink transmission on the second cell, wherein applying the relative power difference includes transmitting the first uplink transmission on the first cell at a lower power level than the second uplink transmission on the second cell based at least in part on the second cell including one or more secondary cells.

2. The method of claim 1, wherein the first cell includes a primary cell, a primary secondary cell, or a physical uplink control channel secondary cell.

3. The method of claim 1, wherein the relative power difference is applied based at least in part on the first uplink transmission on the first cell and the second uplink transmission on the second cell having a total calculated transmit power that fails to satisfy a maximum power limit for the transmission occasion.

4. The method of claim 3, wherein applying the relative power difference causes the first uplink transmission on the first cell and the second uplink transmission on the second cell to have a total actual transmit power that satisfies the maximum power limit for the transmission occasion.

5. The method of claim 1, wherein applying the relative power difference causes the first uplink transmission on the first cell to be scaled or dropped.

6. The method of claim 1, wherein the signaling indicates the relative power difference as a decibel value.

7. The method of claim 1, wherein the signaling indicates the relative power difference as a ratio or a percentage value.

8. The method of claim 1, wherein the signaling that indicates the relative power difference includes a radio resource control message, a medium access control element, or downlink control information.

9. The method of claim 1, wherein the relative power difference is indicated for an uplink carrier aggregation configuration or an uplink dual connectivity configuration.

10. A user equipment (UE) for wireless communication, comprising:
    a memory; and
    one or more processors, coupled to the memory, configured to:
      receive, from a base station, signaling that indicates a relative power difference between a first cell and a second cell; and
      apply the relative power difference in a transmission occasion that includes at least a first uplink transmission on the first cell and a second uplink transmission on the second cell, wherein applying the relative power difference includes transmitting the first uplink transmission on the first cell at a lower power level than the second uplink transmission on the second cell based at least in part on the second cell including one or more secondary cells.

11. The UE of claim 10, wherein the first cell includes a primary cell, a primary secondary cell, or a physical uplink control channel secondary cell.

12. The UE of claim 10, wherein the relative power difference is applied based at least in part on the first uplink transmission on the first cell and the second uplink transmission on the second cell having a total calculated transmit power that fails to satisfy a maximum power limit for the transmission occasion.

13. The UE of claim 12, wherein applying the relative power difference causes the first uplink transmission on the first cell and the second uplink transmission on the second cell to have a total actual transmit power that satisfies the maximum power limit for the transmission occasion.

14. The UE of claim 10, wherein applying the relative power difference causes the first uplink transmission on the first cell to be scaled or dropped.

15. The UE of claim 10, wherein the signaling indicates the relative power difference as a decibel value.

16. The UE of claim 10, wherein the signaling indicates the relative power difference as a ratio or a percentage value.

17. The UE of claim 10, wherein the signaling that indicates the relative power difference includes a radio resource control message, a medium access control element, or downlink control information.

18. The UE of claim 10, wherein the relative power difference is indicated for an uplink carrier aggregation configuration or an uplink dual connectivity configuration.

19. A non-transitory computer-readable medium storing a set of instructions for wireless communication, the set of instructions comprising:
one or more instructions that, when executed by one or more processors of a user equipment (UE), cause the UE to:
receive, from a base station, signaling that indicates a relative power difference between a first cell and a second cell; and
apply the relative power difference in a transmission occasion that includes at least a first uplink transmission on the first cell and a second uplink transmission on the second cell, wherein applying the relative power difference includes transmitting the first uplink transmission on the first cell at a lower power level than the second uplink transmission on the second cell based at least in part on the second cell including one or more secondary cells.

20. The non-transitory computer-readable medium of claim 19, wherein the first cell includes a primary cell, a primary secondary cell, or a physical uplink control channel secondary cell.

21. The non-transitory computer-readable medium of claim 19, wherein the relative power difference is applied based at least in part on the first uplink transmission on the first cell and the second uplink transmission on the second cell having a total calculated transmit power that fails to satisfy a maximum power limit for the transmission occasion.

22. The non-transitory computer-readable medium of claim 21, wherein applying the relative power difference causes the first uplink transmission on the first cell and the second uplink transmission on the second cell to have a total actual transmit power that satisfies the maximum power limit for the transmission occasion.

23. The non-transitory computer-readable medium of claim 19, wherein applying the relative power difference causes the first uplink transmission on the first cell to be scaled or dropped.

24. The non-transitory computer-readable medium of claim 19, wherein the signaling indicates the relative power difference as a decibel value, a ratio, or a percentage value.

25. An apparatus for wireless communication, comprising:
means for receiving, from a base station, signaling that indicates a relative power difference between a first cell and a second cell; and
means for applying the relative power difference in a transmission occasion that includes at least a first uplink transmission on the first cell and a second uplink transmission on the second cell, wherein applying the relative power difference includes transmitting the first uplink transmission on the first cell at a lower power level than the second uplink transmission on the second cell based at least in part on the second cell including one or more secondary cells.

26. The apparatus of claim 25, wherein the first cell includes a primary cell, a primary secondary cell, or a physical uplink control channel secondary cell.

27. The apparatus of claim 25, wherein the relative power difference is applied based at least in part on the first uplink transmission on the first cell and the second uplink transmission on the second cell having a total calculated transmit power that fails to satisfy a maximum power limit for the transmission occasion.

28. The apparatus of claim 27, wherein applying the relative power difference causes the first uplink transmission on the first cell and the second uplink transmission on the second cell to have a total actual transmit power that satisfies the maximum power limit for the transmission occasion.

29. The apparatus of claim 25, wherein applying the relative power difference causes the first uplink transmission on the first cell to be scaled or dropped.

30. The apparatus of claim 25, wherein the signaling indicates the relative power difference as a decibel value, a ratio, or a percentage value.

* * * * *